United States Patent
Zhang et al.

(10) Patent No.: US 11,719,883 B1
(45) Date of Patent: Aug. 8, 2023

(54) INTEGRATED GAAS ACTIVE DEVICES WITH IMPROVED OPTICAL COUPLING TO DIELECTRIC WAVEGUIDES

(71) Applicants: Chong Zhang, Santa Barbara, CA (US); Minh Tran, Goleta, CA (US); Tin Komljenovic, Goleta, CA (US); Hyun Dai Park, Goleta, CA (US)

(72) Inventors: Chong Zhang, Santa Barbara, CA (US); Minh Tran, Goleta, CA (US); Tin Komljenovic, Goleta, CA (US); Hyun Dai Park, Goleta, CA (US)

(73) Assignee: Nexus Photonics Inc, Goleta, CA (US)

( * ) Notice: Subject to any disclaimer, the term of this patent is extended or adjusted under 35 U.S.C. 154(b) by 57 days.

(21) Appl. No.: 17/675,328

(22) Filed: Feb. 18, 2022

(51) Int. Cl.
*G02B 6/122* (2006.01)
*G02B 6/30* (2006.01)

(52) U.S. Cl.
CPC .......... *G02B 6/1228* (2013.01); *G02B 6/305* (2013.01)

(58) Field of Classification Search
None
See application file for complete search history.

(56) References Cited

U.S. PATENT DOCUMENTS

| | | | | |
|---|---|---|---|---|
| 6,083,843 A * | 7/2000 | Ohja | ......... | G02B 6/30 438/723 |
| 7,082,235 B2 * | 7/2006 | Gunn, III | ......... | B82Y 20/00 385/28 |
| 7,643,710 B1 * | 1/2010 | Liu | ......... | B82Y 20/00 385/39 |
| 8,285,092 B2 * | 10/2012 | Deki | ......... | G02B 6/305 385/28 |
| 9,025,920 B2 * | 5/2015 | Kim | ......... | G02B 6/305 385/43 |
| 9,151,892 B2 * | 10/2015 | Takahashi | ......... | G02B 6/305 |
| 9,335,475 B2 * | 5/2016 | Ono | ......... | G02B 6/12002 |
| 9,435,946 B2 * | 9/2016 | Sakakibara | ......... | G02B 6/12002 |
| 9,575,251 B1 * | 2/2017 | Lee | ......... | G02B 6/14 |
| 9,633,683 B2 * | 4/2017 | Lee | ......... | G02B 6/1228 |
| 9,746,607 B2 * | 8/2017 | Collins | ......... | G02B 6/1228 |
| 9,915,782 B2 * | 3/2018 | Ahn | ......... | G02B 6/12004 |
| 10,031,293 B2 * | 7/2018 | Park | ......... | G02B 6/305 |
| 10,429,589 B2 * | 10/2019 | Bookbinder | ......... | G02B 6/0281 |

(Continued)

*Primary Examiner* — Jerry Rahll
(74) *Attorney, Agent, or Firm* — Shalini Venkatesh

(57) ABSTRACT

A device includes three elements fabricated on a common substrate. The first element includes an active waveguide structure having at least three sub-layers supporting a first optical mode. The second element has a passive waveguide structure supporting a second optical mode, and the third element, butt-coupled to the first element, has an intermediate waveguide structure supporting intermediate optical modes. One sub-layer in the active waveguide structure includes an n-contact layer, another sub-layer includes a p-contact layer, and a third sub-layer includes an active region. A tapered waveguide structure in at least one of the second and third elements facilitates efficient adiabatic transformation between the second optical mode and an intermediate optical mode. No adiabatic transformation occurs between that intermediate optical mode and the first optical mode. Mutual alignments of the three elements are defined using lithographic alignment marks that facilitate precise alignment between layers formed fabrication of the elements.

17 Claims, 8 Drawing Sheets

(56) References Cited

U.S. PATENT DOCUMENTS

| | | | |
|---|---|---|---|
| 10,718,898 B1* | 7/2020 | Park | G02B 6/13 |
| 2003/0068152 A1* | 4/2003 | Gunn, III | G02B 6/1228 |
| | | | 385/132 |
| 2010/0040327 A1* | 2/2010 | Deki | G02B 6/305 |
| | | | 385/28 |
| 2013/0156370 A1* | 6/2013 | Kim | G02B 6/305 |
| | | | 385/14 |
| 2013/0322816 A1* | 12/2013 | Takahashi | G02B 6/262 |
| | | | 385/27 |
| 2014/0294341 A1* | 10/2014 | Hatori | G02B 6/1228 |
| | | | 385/14 |
| 2015/0086153 A1* | 3/2015 | Ono | G02B 6/124 |
| | | | 385/11 |
| 2016/0139334 A1* | 5/2016 | Sakakibara | G02B 6/1228 |
| | | | 385/43 |
| 2016/0247525 A1* | 8/2016 | Lee | G02B 6/136 |
| 2016/0327742 A1* | 11/2016 | Collins | G02B 6/1228 |
| 2017/0045686 A1* | 2/2017 | Lee | G02B 6/1228 |
| 2018/0039022 A1* | 2/2018 | Ahn | G02B 6/1228 |
| 2018/0100970 A1* | 4/2018 | Park | G02B 6/1228 |
| 2018/0224607 A1* | 8/2018 | Bookbinder | G02B 6/421 |
| 2020/0233149 A1* | 7/2020 | Park | G02B 6/13 |

* cited by examiner

US 11,719,883 B1

INTEGRATED GAAS ACTIVE DEVICES WITH IMPROVED OPTICAL COUPLING TO DIELECTRIC WAVEGUIDES

CROSS-REFERENCES TO RELATED APPLICATIONS

This application is related to U.S. application Ser. No. 16/878,563 filed 2020 May 19, issued as U.S. Pat. No. 10,859,764.

FIELD OF THE INVENTION

The present invention relates to semiconductor processing. More specifically, certain embodiments of the invention relate to a method and system for realization of photonic integrated circuits using dissimilar materials that are optically coupled.

BACKGROUND OF THE INVENTION

A photonic integrated circuit (PIC) or integrated optical circuit is a device that integrates multiple photonic functions and as such is analogous to an electronic integrated circuit. The major difference between the two is that a photonic integrated circuit provides functions for information signals imposed on optical carrier waves. The material platform most commercially utilized for photonic integrated circuits is indium phosphide (InP), which allows for the integration of various optically active and passive functions on the same chip. Although many current PICs are realized in InP platforms, there has been significant research in the past decade in using silicon rather than InP for the realization of PICs, due to some superior characteristics as well as superior processing capabilities for the former material, that leverage the investment already made for electronic integrated circuits.

The biggest drawback in using silicon for PICs is that it is an indirect bandgap material which makes it hard to provide electrically pumped sources. This problem is generally solved by assembling PICs comprising two or more chips made from dissimilar materials in separate processes. Such an approach is challenging due to a need for very fine alignment, which increases packaging costs and introduces scaling limitations. Another approach to solving the bandgap problem is to bond two dissimilar materials and process them together, removing the need for precise alignment during the bonding of larger pieces or complete wafers of the dissimilar materials, and allowing for mass fabrication. In this disclosure, we use the term "hybrid" to describe the first approach that includes precise assembly of separately processed parts, and we use the term "heterogeneous" to describe the latter approach of bonding two materials and then processing the bonded result to define the waveguides and other components of interest.

To transfer the optical signal between dissimilar materials, the heterogeneous approach utilizes tapers whose dimensions are gradually reduced until the effective mode refractive indices of dissimilar materials match and there is efficient power transfer. This approach generally works well when materials have similar refractive indices as is the case with silicon and InP. In cases where there is larger difference in effective indices, such as between e.g. SiN and GaAs, the requirements on taper tip dimensions become prohibitive limiting efficient power transfer. Specifically, extremely small taper tip widths (of the order of nanometers) may be necessary to provide good coupling. Achieving such dimensions is complex and may be cost prohibitive.

Although InP and silicon-based PICs address many current needs, they have some limitations; among them the fact that the operating wavelength range is limited by material absorption increasing the losses, and the fact that there is a limit on the maximum optical intensities and consequently optical powers that a PIC can handle. To address these limitations, alternate waveguide materials have been considered, such as SiN, $TiO_2$, $Ta_2O_5$, AlN or others. In general, such dielectric waveguides have higher bandgap energies which provides better high-power handling and transparency at shorter wavelength, but, in general such materials also have lower refractive indices. For example, SiN with a bandgap of ~5 eV has a refractive index of ~2, AlN has a bandgap of ~6 eV and a refractive index of around ~2, and $SiO_2$ with a bandgap of ~8.9 eV has a refractive index of ~1.44. For comparison, the refractive index of GaAs is >3. This makes the tapered approach challenging.

The alternative hybrid approach suffers from the drawbacks already mentioned above, namely the need for precise alignment, and correspondingly complex packaging and scaling limitations.

A recent approach to the problems discussed above was presented in U.S. Pat. No. 10,859,764 B2, referenced above, employing butt-coupling in combination with a mode-converter to allow the heterogenous process to be used without the need for extremely small taper widths. The present invention is directed towards PICs employing butt-coupling in this way, and that include an active device such as a laser. In particular, embodiments described below are concerned with the detailed design of the sub-structures of active material necessary for creation of high-performance lasers, amplifiers, modulators and photodetectors.

DETAILED DESCRIPTION

Described herein include embodiments of a method and system for realization of photonic integrated circuits using wafer bonding and deposition of dissimilar materials where optical coupling is improved by use of mode conversion and a butt-coupling scheme.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

Figure 4:
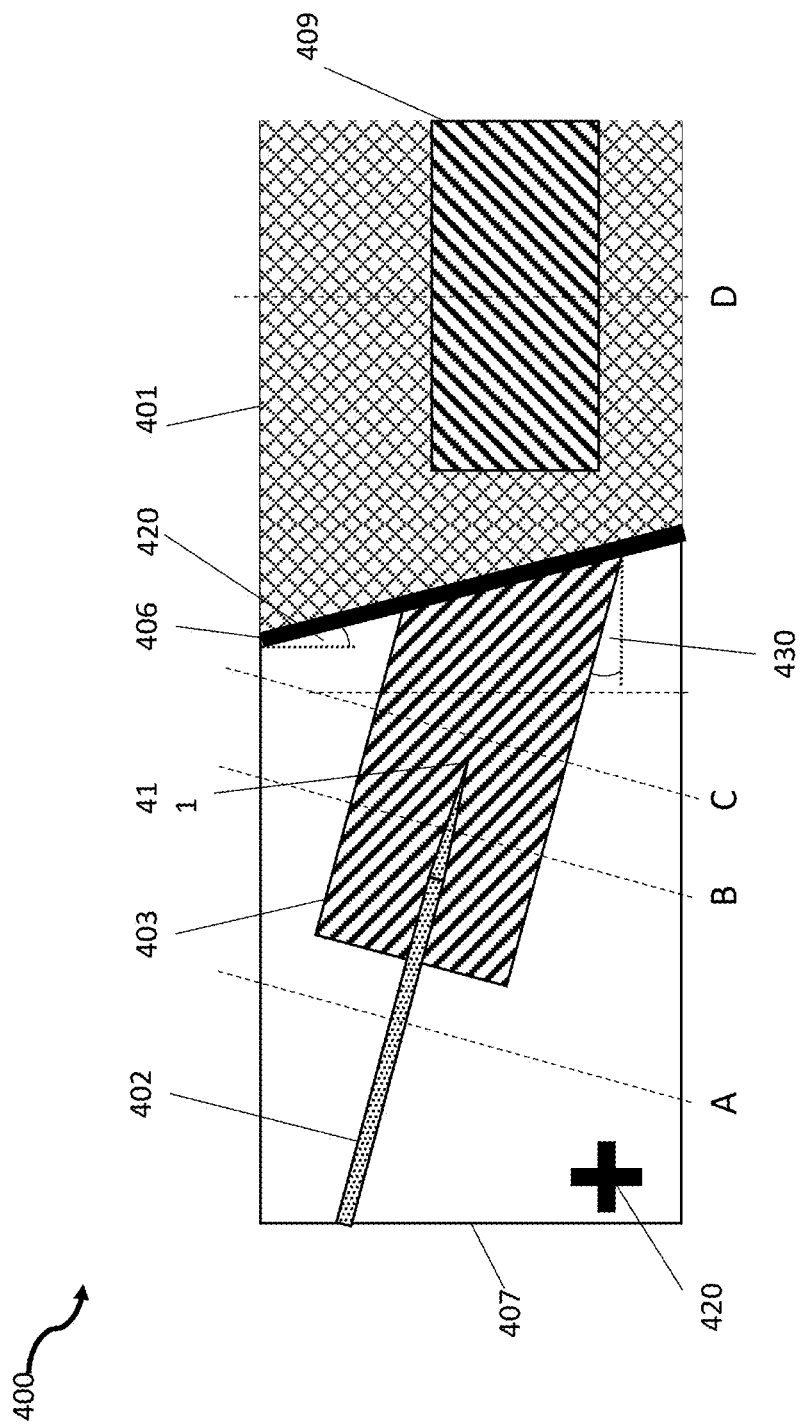
FIG. 4 shows a cross-sectional top-down view of a device according to some embodiments of the present invention.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" means that two or more elements are in direct contact in at least part of their surfaces. The term "butt-coupled" is used herein in its normal sense of meaning an "end-on" or axial coupling, where there is minimal or zero axial offset between the elements in question. The axial offset may be, for example, slightly greater than zero in cases where a thin intervening layer of some sort is formed between the elements, as described below with regard to elements 106, 206 and 306. It should be noted that the axes of two waveguide structures or elements need not be colinear for them to be accurately described as being butt-coupled. In other words, the interface between the elements need not be perpendicular to either axis. FIG. 4 embodiments discussed below are exemplary of such possibilities.

Terms "active device" and/or "active region", may be used herein. A device or a region of a device called active is capable of light generation, amplification, modulation and/or detection. We use "active device" and "active region" interchangeably meaning either one of them and/or both. This is in contrast to what we mean by a "passive device" and/or "passive region" whose principal function is to confine and guide light, and/or provide splitting, combining, filtering and/or other functionalities that are commonly associated with passive devices. Some passive devices can provide functions overlapping with active device functionality, such as e.g. phase tuning implemented using thermal effects or similar that can provide modulation. The difference in this case is in performance, with active devices generally providing higher efficiencies, lower power consumption, larger bandwidth and/or other benefits. No absolute distinction should be assumed between "active" and "passive" based purely on material composition or device structure. A silicon device, for example, may be considered active under certain conditions of modulation, or detection of low wavelength radiation, but passive in most other situations.

Figure 1:
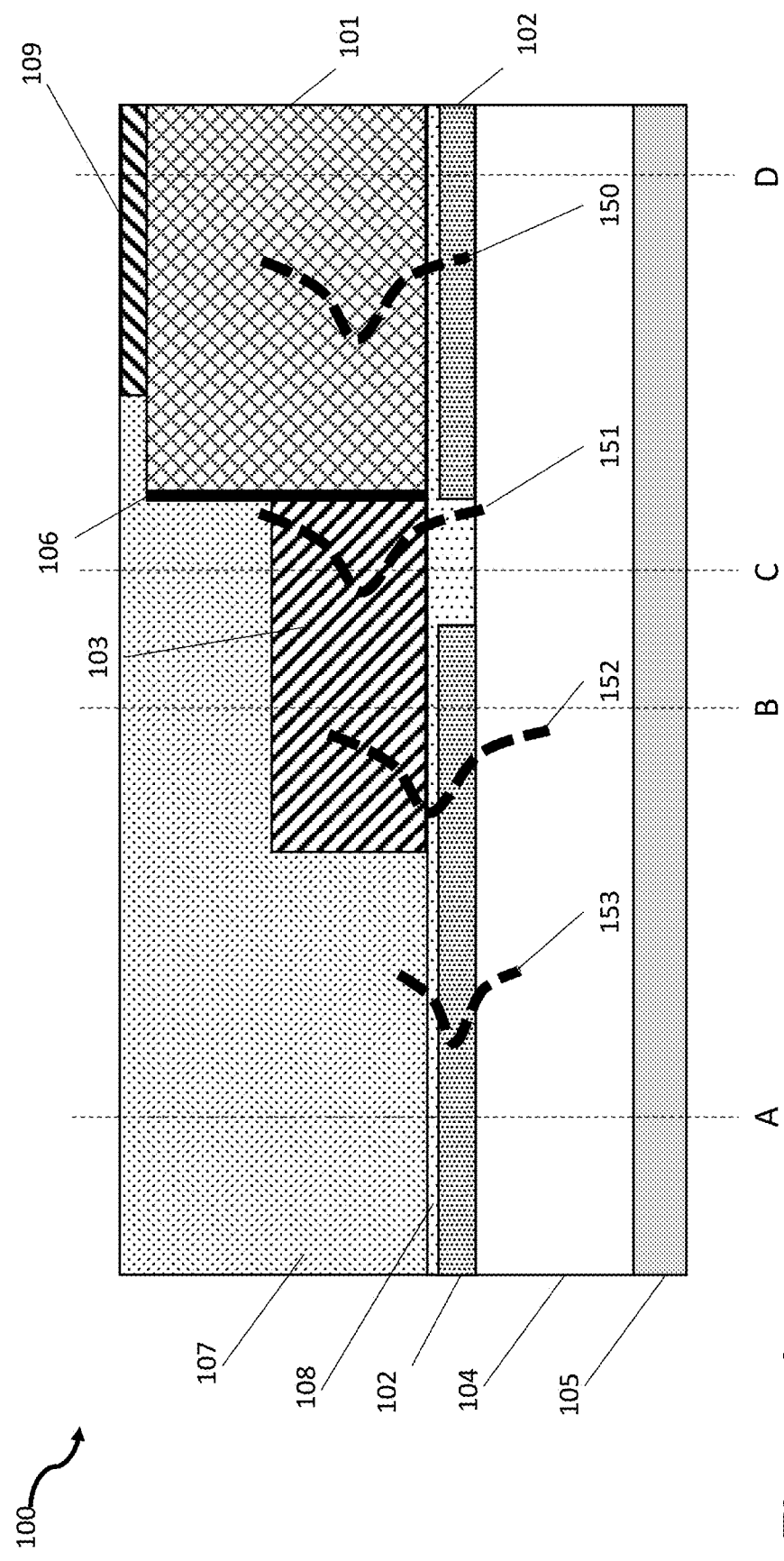
FIG. 1 illustrates a device according to one embodiment of the present invention, shown in an axial cross section.

FIG. 1 is a schematic cross-section view of an integrated photonic device 100 utilizing butt-coupling and mode conversion for efficient coupling between dissimilar materials. The exemplary cross-section includes a substrate 105 that can be any suitable substrate for semiconductor and dielectric processing, such as Si, InP, GaAs, quartz, sapphire, glass, GaN, silicon-on-insulator or other materials known in the art. In the shown embodiment, a layer of second material 104 is deposited, grown, transferred, bonded or otherwise attached to the top surface of substrate 105 using techniques known in the field. The main purpose of layer 104 is to provide optical cladding for material 102 (to be described below), if necessary to form an optical waveguide. Optical waveguides are commonly realized by placing higher refractive index core between two lower refractive index layers to confine the optical wave. In some embodiments, layer 104 is omitted and substrate 105 itself serves as a cladding.

Layer 102 is deposited, grown, transferred, bonded or otherwise attached to the top of layer 104 if present, and/or to the top of substrate 105, using techniques known in the field. The refractive index of layer 102 is higher than the refractive index of layer 104 if present, or, if layer 104 is not present, the refractive index of layer 102 is higher than the refractive index of substrate 105. In one embodiment, the material of layer 102 may include, but is not limited to, one or more of SiN, TiO2, Ta2O5, SiO2, LiNbO3 and AlN. In some embodiments, other common dielectric materials may be used for layer 102. In other embodiments, a semiconductor material may be used for layer 102. In some embodiments refractive index of layer 102 is between 1.8 and 2.5. Either or both of layers 104 and 102 can be patterned, etched, or redeposited as is common in the art.

Layer 108, whose refractive index is lower than the refractive index of layer 102, overlays layer 102 and underlays layers 101 and 103 (to be described in more detail below) serves to planarize the patterned surface of layer 102. In some embodiments, the planarity of the top surface of layer 108 is provided by chemical mechanical polishing (CMP) or other etching, chemical and/or mechanical polishing methods. In other embodiments, the planarity is provided because of the intrinsic nature of the method by which layer 108 is deposited, for example if the material of layer 108 is a spin-on glass, polymer, photoresist or other suitable material. The planarization may be controlled to leave a layer of desired, typically very low, thickness on top of the layer 102 (as shown in FIG. 1), or to remove all material above the level of the top surface of the layer 102 (not shown). In the case layer 108 is left on top of layer 102, the target thicknesses are in the range of 10 nm to several hundreds of nm, with practical thickness including the typical across wafer non-uniformity of the planarization process. In some embodiments, spin-on material is used to planarize and is then etched back resulting with improved across wafer uniformity compared to typical CMP processes. In all the above cases, the resulting top surface of 102 (in the absence of spin on material) or the resulting top surface of 108 (if the spin-on material is present) is a planar surface.

Layer 101 is bonded on top of at least part of the corresponding (108, 102) top surface. Said bonding can be direct molecular bonding or can use additional materials to facilitate bonding such as e.g. metal layers or polymer films as is known in the art. Layer 101 makes up what is commonly called an active region, and may be made up of materials including, but not limited to, GaAs and GaAs based ternary and quaternary materials as will be described in more detail with the help of FIG. 4. Layer 101 in one embodiment is multilayered, comprising layers providing both optical and electrical confinement as well as electrical contacts, as is known in the art for active devices. In yet another embodiment, layer 101 uses lower layers 102, 108, 104 and/or 105 to provide electrical and/or optical confinement and one or more electrical contacts.

In some embodiments, layer 101 can be efficiently electrically pumped to generate optical emission and gain. The present invention enables efficient optical coupling between waveguides formed in layer 101 and layer 102. Said materials 102 can provide additional functionality such as wideband transparency, high intensity handling, phase shifting by temperature, strain or other tuning mechanisms, combining, splitting, filtering and/or others as is known in the art.

Efficient coupling is facilitated by layer 103, and, in cases where layer 106 is present, by layer 106. Optional layer 106 primarily serves as either an anti-reflective or a highly-reflective coating at the interface between layer 101 and layer 103. Layer 103 serves as an intermediate waveguide that in some embodiments accepts the profile (depicted by dashed line 150) of an optical mode supported by the waveguide for which layer 101 provides the core, captures it efficiently as mode profile 151, and gradually transfers it to mode profiles 152, and finally 153. Mode profile 153 is then efficiency coupled to the waveguide for which layer 102 provides the core. In other embodiments, the direction of travel may be reversed, with layer 103 efficiently capturing an optical mode supported by the waveguide for which layer 102 provides the core and gradually transforming its mode profile to that of a mode supported by the waveguide for which layer 101 provides the core.

The refractive index of layer 103 can be engineered to facilitate efficient coupling of mode profile 150 and to efficiently transform the mode to one with mode profile 153 by taking advantage of tapered structures made in layer 102 and/or 103. In some embodiments the refractive index of layer 103 is between 1.55 and 1.8. In some embodiments, layer 103 is a dielectric layer such as SiNOx. In yet other embodiments, layer 103 can be a polymer. In yet another embodiments, layer 103 can be any other material with a suitable refractive index.

The thickness of layer 103 is an optimization parameter, and in some embodiments it is between 400 nm and 2000 nm. Prior to the present invention i.e. in the absence of intermediate layer 103, the requirements on taper tip width would be, as discussed above, problematic. The use of intermediate layer 103, however, significantly reduces the stringent requirements on taper tip width, allowing efficient transfer between very high refractive index materials (such as e.g. GaAs in layer 101) to low refractive index materials (such as e.g. SiN in layer 102).

Differences between the optical modes supported by waveguides in layers 101 and 102 respectively may or may not be obvious by observation of the mode profiles, but mode overlaps less than 100% could (in the absence of intermediate layer 103) result in significant optical loss. In some cases, it may be considered that losses of up to 1 dB are acceptable, but losses greater than that are not. In other cases, a 3 dB loss level may be the criterion chosen. The function of layer 103 is to keep optical loss due to imperfect mode overlap below whatever is determined to be an acceptable level in a given application.

Figure 5:
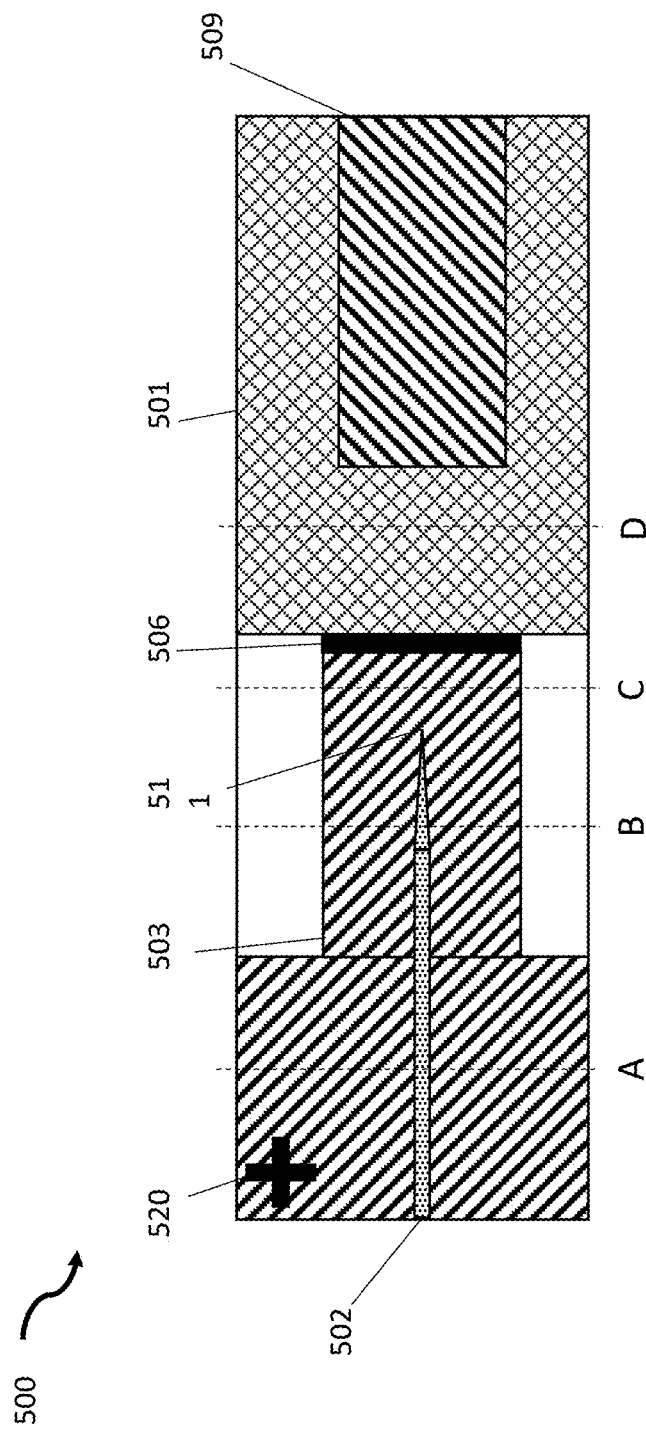
FIG. 5 shows a cross-sectional top-down view of a device according to some embodiments of the present invention.

The upper cladding layer 107 for waveguides realized in 103 and/or 102 can be ambient air (meaning no cladding material is actually deposited) or can be any other deliberately deposited suitable material as shown in FIG. 1, including, but not limited to, a polymer, SiO2, SiNx, SiNOx etc. In some embodiments same material is used for layer 107 and layer 108. In some embodiments (not shown), layer 107 cladding functionality can be provided with multiple depositions, e.g. one material provides the cladding for mode 153 guided by core formed in layer 102, and another material provides the cladding for mode 151 guide by core formed in layer 103. In all cases, the refractive index of cladding material is lower than the refractive index of the material which provides the core for the mode guiding. In yet other embodiments (as shown in FIG. 5), layer 103 can provide cladding functionality to layer 102 and mode 153, owning to its refractive index being lower by design. These embodiments are discussed further below with reference to FIG. 5.

Layer 109 is a contact metal deposited on top of part of layer 101. Layer 101 is made up of at least three sub-layers, which will be discussed in detail below in the description of FIG. 2a. One or more lithography alignment marks (not shown in this cross sectional view, but see, for example, 320 in FIG. 3 and 420 in FIG. 4 described below) are present to facilitate precise alignment between the layers formed during various processing steps.

In some embodiments, layer 108 is not present and both layer 101 is bonded and layer 103 is deposited on top of a pattern layer 102. In such embodiments, there is no planarization step.

Figure 2A:
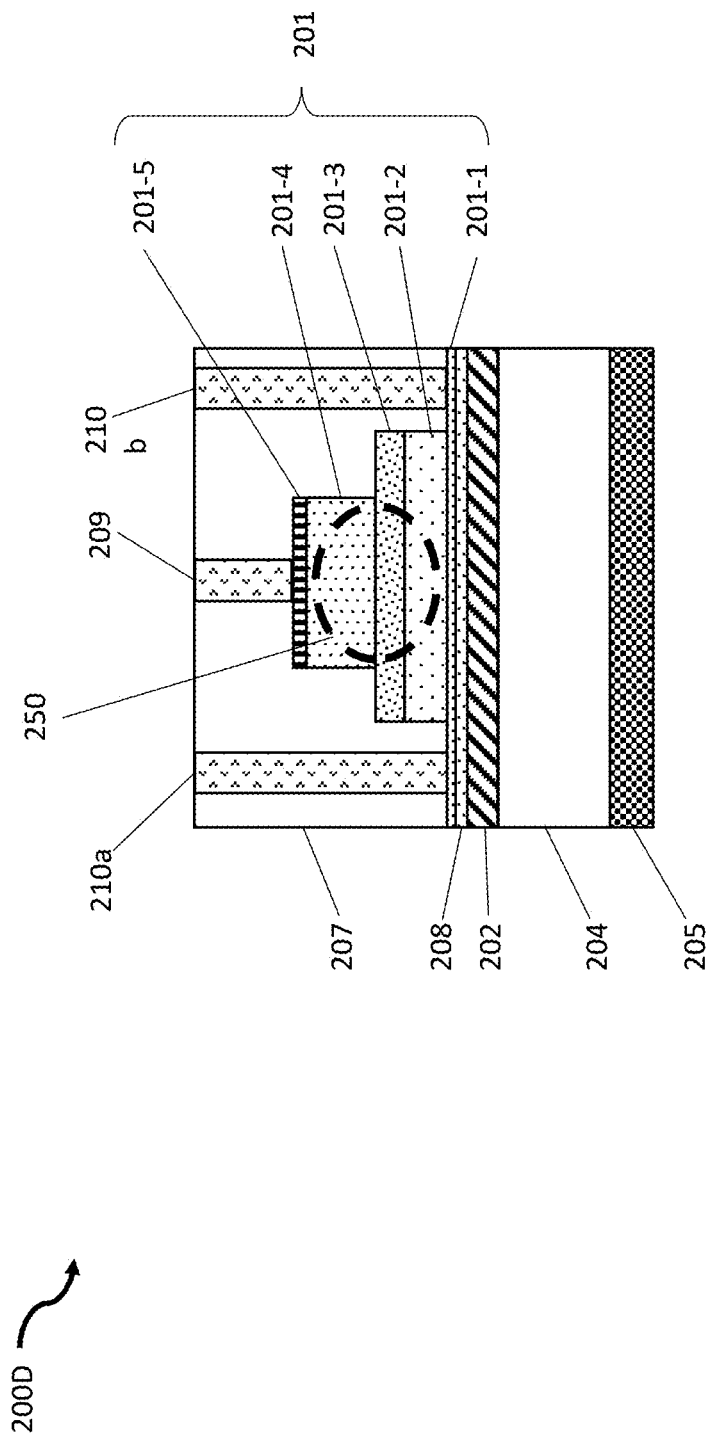
FIG. 2a shows cross-sectional end-on views at three different axial positions of a device corresponding to an embodiment of FIG. 1.
Figure 2B:
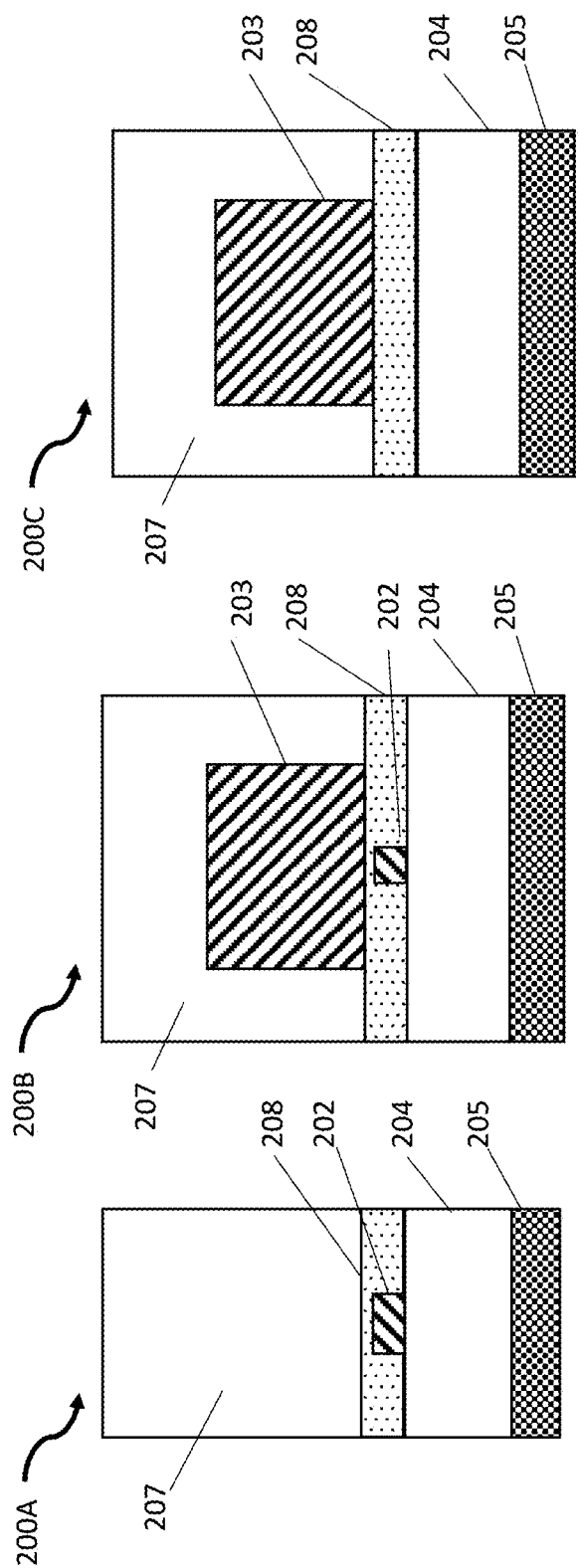
FIG. 2b shows a cross-sectional end-on view at a fourth axial position of a device corresponding to an embodiment of FIG. 1.

Dashed lines A, B, C and D correspond to cross-sectional end-on views of a device according to some embodiments of the present invention described in more detail with the help of FIG. 2a, showing end-on view 200D, and FIG. 2b, showing end-on-views 200A, 200B, and 200C.

Figure 3:
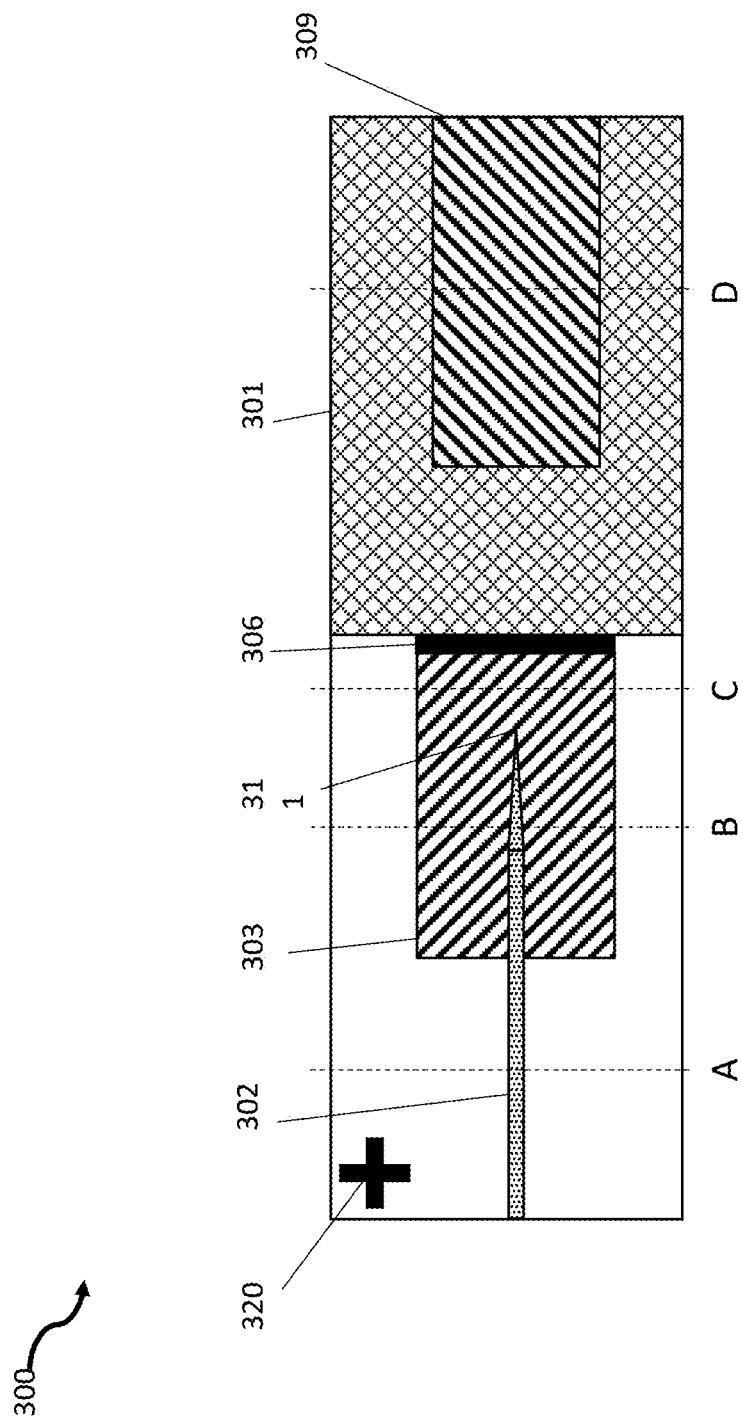
FIG. 3 shows a cross-sectional top-down view of a device according to some embodiments of the present invention.

FIG. 2a shows a cross-sectional view 200D corresponding to a characteristic location marked D in FIG. 1 (and in FIGS. 3-4), with FIG. 2b showing three cross-sectional views 200A, 200B, and 200C corresponding to three characteristic locations marked A, B, and C, in FIG. 1 (and in FIGS. 3-4). Functional layers 201 to 209 (unless explicitly defined differently) correspond to functional layers 101 to 109 as described in relation to FIG. 1, and to functional layers 301 to 309 as described in relation to FIG. 3 and functional layers 401 to 409 as described in relation to FIG. 4.

Cross-section 200D is an exemplary cut through a region that comprises active layer 201 (corresponding to 101, 301 and 401 in FIGS. 1, 3, 4). Layer 201 comprises multiple sub-layers providing necessary functionality to realize active devices. In the embodiment shown, layer 201 is on top of layer 208 providing a planarized surface for bonding. In another embodiment (not shown), layer 201 is on top of layer 202 as a previously present planarization layer 208 has been completely removed from the top of layer 202. In yet another embodiment (not shown), layer 201 is on top of layer 202 without any planarization layer having been present. In yet another embodiment (not shown), layer 201 is on top of layer 204 (if layer 202 is completely removed) and/or is on top of layer 205 (if layer 202 and 204 are completely removed).

Layer 201 serves to define optical and electrical confinement to facilitate high performance active devices. Optical confinement in a vertical direction (as viewed in FIG. 2) is provided by having material compositions corresponding to different refractive indices, and optical confinement in a horizontal direction is provided by at least one etch to provide for a cladding (207) with a refractive index lower than that of layer 201. Cladding 207 can comprise multiple materials, some of which might provide passivation functionality to the etched surfaces leading to improved laser performance. Electrical confinement is provided by suitable material composition, and by creating etched or implanted current channels.

In one embodiment, the active layer 201 comprises five distinct functional layers: 201-1, 201-2, 201-3, 201-4 and 201-5.

201-1 provides n-contact layer comprising highly N+ doped GaAs layers. In some embodiments doping is >1e18. In some embodiments, 201-1 includes superlattice layers to facilitate bonding and/or prevent dislocations. An example of a superlattice would be a combination of GaAs and AlGaAs layers, a combination of InGaP and InAlP layers or other suitable combinations. The thickness of this layer is typically between 50 nm and 200 nm, but it can also be larger in some embodiments. N-metal and vias to connect to electrical pads (210a and 210b) are laterally offset from the optical mode 250 (whose lateral confinement is defined by at least one etch) leading to very low or negligible optical loss due to the n-contact metal.

201-2 provides n-side cladding and is typically realized as an AlGaAs layer. The Al content can be fixed, stepwise changed or gradually changed, and depends on the wavelength of operation. As the n contact metal (210a and 210b) is laterally offset, thickness is not driven by metal loss and is an optimization parameter to facilitate mode shape, active region confinement and coupling to layer 203. In some embodiments, the thickness of 201-2 is between 100 nm and 1000 nm. 201-2 can also comprise one or more etch stop layers such as e.g. InGaP or others. In some embodiments, the etch stop layer thickness is between 5 nm and 80 nm. Sublayer 201-2 is doped at a fixed concentration or doped with a concentration that varies, being increased from its lowest concentration at the boundary with 201-3 to high doping levels of between 5e17 and 4e18 at the boundary with layer 201-1.

201-3 is the active region that in one embodiment comprises quantum wells, quantum barriers and separate confinement heterostructure (SCH) layers on at least one side of the quantum well/barrier structure. In some embodiments, quantum dots are used instead of quantum wells. In other embodiments quantum dots embedded inside quantum wells are used. In yet another embodiment bulk p(i)n-junctions are defined in active region to provide e.g. photodetector functionality or bulk phase/intensity modulator functionality. SCH layer can be graded or non-graded. In some embodiments it is realized as AlGaAs material with constant doping or varying concentration of doping. In the case of graded doping, the doping generally increases as distance from the quantum wells/quantum dots/pn-junction increases.

201-4 is the p-side cladding, typically realized as an AlGaAs layer. The Al content can be fixed, stepwise changed or gradually changed, and depends on the wavelength of operation. The thickness of 201-4 and the Al content are parameters that are optimized to reduce both the effect of absorption loss in this layer and the absorption loss in the contact layer above. In some embodiments, the thickness of 201-4 is between 100 nm and 2000 nm. 201-4 can also comprise one or more etch stop layers such as e.g. InGaP or others. In some embodiments, the etch stop layer thickness is between 5 nm and 80 nm. Layers are doped at a fixed level, or doped with a concentration that varies, being reduced from the highest concentration at the boundary with layer 201-5 to lower doping levels at the boundary with layer 201-3.

201-5 is the p-contact layer. In some embodiments highly P+ doped GaAs layers are used for p-contact. In some embodiments, doping levels are >1e18.

In some embodiments, not all layers 201-1 to 201-5 are present, but at minimum there is an active region (201-3), an n-contact region (201-1) and a p-contact region (201-5). In some embodiments, additional etch stop layers are introduced to facilitate better process control.

In FIG. 2b, cross-section 200A shows one embodiment at the far left of the device as shown in FIG. 1 (and FIGS. 3 and 4 to be described below) after optical coupling to layer 402 (assuming optical signal flow occurs from right to left in FIGS. 1, 3 and 4) is complete. Cross-section 200B shows one embodiment in which mode transition from one dominantly residing in layer 203 to one dominantly residing in layer 202 is facilitated. This transition is facilitated by tapers realized in at least one of the layers 202 and 203. Cross-section 200C shows one embodiment in which mode dominantly resides in layer 203 after it was butt-coupled from the structure providing guiding in cross-section 200D. Typical heights and widths of the waveguides formed in layers 201, 202, and 203 can range from submicron (as little as 20 nm) to several microns, although they are largely dependent on specific material systems and implementations. Optimal dimensions (width, height, sidewall angle, etc.) to facilitate efficient coupling can be readily calculated using e.g. commercial simulation tools or similar. In some embodiments thickness of layer 202 (vertical dimension in FIG. 2) is between 20 nm and 400 nm, in yet other embodiments it is between 400 nm and 2000 nm.

In some embodiments at least two etches are utilized (as shown in FIG. 2a). One etch defines the optical mode confinement, and another etch opens the n-contact region for metal deposition. In some embodiments a single etch is used to define optical mode confinement and to open the n-contact region for metal deposition. In other embodiments, more than two etches are used to provide additional control of the optical confinement, sidewall recombination, active region pump efficiency and n-contact region access. Etches can be timed and/or can utilize etch stop layers for improved control.

In some embodiments, the pattern defined in layers 202, 204, 205 and/or 208 can provide frequency selective feedback to the optical mode dominantly residing in layer 201 through the evanescent tail of the mode. Such frequency selective feedback can be utilized to define single frequency lasers (e.g. distributed feedback lasers or others).

FIG. 3 offers a top-down view of an integrated photonic device 300 utilizing butt-coupling and mode conversion for efficient coupling between dissimilar materials. Dashed lines A, B, C and D correspond to cross-sectional end-on views of a device according to some embodiments of the present invention described above in more detail with the help of FIGS. 2a and 2b and more specifically end-on-views 200A, 200B, 200C and 200D.

The optical mode supported by active layer 301 is guided through optional coating layer 306 to layer 303 that serves to convert the mode for efficient coupling to layer 302. Layer 306 can provide high-reflection functionality, or can facilitate reduced reflection when designed to function as anti-reflection coating. To facilitate coupling between modes supported by layers 301 and 302, the dimensions of layer 302 are tapered down towards layer 301, as indicated by the relatively small width of the tip 311 relative to the width of layer 302 shown at the extreme left of the figure. It has been calculated that the requirements on taper dimensions are significantly relaxed up to several hundred nanometers due to the presence of layer 303. For example, a coupling efficiency between 301 and 302 greater than 70% may be achieved, even if the refractive index difference between 301 and 302 is larger than one, for a tip width greater than hundred nanometers. In contrast, in the absence of layer 303, layer 301 would have to be tapered such that its mode may directly couple into layer 302, the dimensions of taper tip of layer 301 (not shown) would have to be much less than one hundred nanometers for a similar coupling efficiency. In another embodiment, a taper is created in layer 303 instead of in layer 302 (not shown). In yet another embodiment, tapers may be created in both layers 302 and 303 for highly efficient coupling. In some embodiments, said tapers in layers 302 and 303 can be multistage tapers meaning they utilize more than one etch depth to facilitate more efficient coupling.

In some embodiments (not shown), the taper tip can physically touch layer 306 or, if layer 306 is not present, layer 301. In yet another embodiment (not shown), there is no abrupt termination of layer 302 in a taper tip, but the width variation continues to facilitate more efficient coupling.

Layer 309 is a contact metal deposited on top of layer 301, corresponding to contact metal 109 on top of layer 101 as described above with regard to the embodiment of FIG. 1, as shown in FIG. 2a.

One or more lithography alignment marks 320 (only one is shown for simplicity) are used for precise alignment between various processing steps.

FIG. 4 depicts a top-down view of an integrated photonic device 400 according to one embodiment of the present invention, where boundaries between dissimilar materials are angled to control both the transmission and back reflection. The optical mode supported by active layer 401 is guided through optional coating layer 406 to layer 403 that serves to convert the mode for efficient coupling to layer 402. Layer 406 can provide high-reflection functionality, or can facilitate reduced reflection when designed to function as anti-reflection coating. To facilitate coupling between modes supported by layers 401 and 402, the dimensions of layer 402 are tapered down towards layer 401, as indicated by the relatively small width of the tip 411 relative to the width of layer 402 shown at the extreme left of the figure. It has been calculated that the requirements on taper dimensions are significantly relaxed up to several hundred nanometers due to the presence of layer 403. For example, a coupling efficiency between 401 and 402 of or greater than 70% may be achieved, even if the refractive index difference between 401 and 402 is larger than one, for a tip width greater than hundred nanometers. In contrast, in the absence of layer 403, layer 401 would have to be tapered such that its mode may directly couple into layer 402, the dimensions of taper tip of layer 401 (not shown) would have to be much less than one hundred nanometers for a similar coupling efficiency. In another embodiment, a taper is created in layer 403 instead of in layer 402 (not shown). In yet another embodiment, tapers may be created in both layers 402 and 403 for highly efficient coupling. In some embodiments, said tapers in layers 402 and 403 can be multistage tapers meaning they utilize more than one etch depth to facilitate more efficient coupling.

Additionally, in this embodiment, one or more of the interfaces between layers 401, 406 and/or 403 are angled to reduce corresponding back reflection(s).

The angle 420 defines the angle between the tangent of the direction of propagation of the wave inside structure 401 and the facet (interface toward 406 and/or 403 if layer 406 is not present). Angle 420 is primarily utilized to control the back reflection of the mode supported by layer 401 when it reaches the interface toward 406 and/or 403. In one embodiment it is substantially equal to 0°. In yet another embodiment it is between 1° and 45°. In yet another embodiment it is substantially equal to 8°. In yet another embodiment it is substantially equal to 12°.

The angle 430 defines the angle between the direction of the propagation of the wave inside the structure 401 and the angle of the waveguide formed by 403. Said angle is an optimization parameter for coupling efficiency between the modes supported by layer 401 and 403 and is related to the choice of the angle 420 and/or the refractive indices of used materials in layers 401 and 403 and their respective claddings. In one embodiment it is substantially equal to 0°. In yet another embodiment it is between 1° and 45°. In yet another embodiment it is substantially equal to 16°. In yet another embodiment it is substantially equal to 20°. In all cases, optimal angle 430 can be calculated using electromagnetic solvers for given combination of angle 420, and effective refractive indices of modes in layers 401 and 403.

Precise vertical alignment (up/down in FIG. 4) between the axis defined by the direction of the propagation of the wave inside the structure 401 and the center of the waveguide 403 at the interface to 403, 406 and/or 401 is an optimization parameter where such offset can be positive (up in FIG. 4), negative (down in FIG. 4) and/or substantially equal to 0 (no offset). Such optimization is straightforward to perform with numerical software to maximize the performance of the transition together with optimizing the angle 420 and angle 430.

Prior to the present invention i.e., in the absence of intermediate layer 103/303/403, the requirements on taper tip width for direct transfer between layer 101/301/401 and 102/302/402 would be problematic. The use of intermediate layer 103/303/403 that is butt-coupled, albeit with angled interface in some embodiments, to layer 101/301/401, however, significantly reduces the stringent requirements on taper tip widths, allowing efficient transfer between very high refractive index materials (such as e.g. GaAs based layers in 101/301/401) to low refractive index materials (such as e.g. SiN, LiNbO$_3$ or similar in layer 102/302/402). Layer 403 may comprise a dielectric, a polymer, and/or any other suitable material. No adiabatic transformation occurs between the optical modes supported by elements 101/301/401 and 103/303/403 at the butt-coupled interface. Layer 103/303/403 and/or layer 102/302/402 can comprise bends (not shown) to control the routing of the guided optical waves. One or more lithography alignment marks 320/420 are present to facilitate precise alignment between the layers formed during various processing steps.

FIG. 5 offers a top-down view of one embodiment an integrated photonic device 500 utilizing butt-coupling and mode conversion for efficient coupling between dissimilar materials. Dashed lines A, B, C and D correspond to cross-sectional end-on views of a device according to some embodiments of the present invention described in more detail with the help of end-on-views 500A, 500B, 500C and 500D.

The optical mode supported by active layer 501 is guided through optional coating layer 506 to layer 503 that serves to convert the mode for efficient coupling to layer 502. Layer 506 can provide high-reflection functionality, or it can facilitate reduced reflection when designed to function as anti-reflection coating. To facilitate coupling between modes supported by layers 501 and 502, the dimensions of layer 502 are tapered down towards layer 501, as indicated by the relatively small width of the tip 511 relative to the width of layer 502 shown at the extreme left of the figure. It has been calculated that the requirements on taper dimensions are significantly relaxed up to several hundred nanometers due to the presence of layer 503. For example, a coupling efficiency between 501 and 502 of or greater than 70% may be achieved, even if the refractive index difference between 501 and 502 is larger than one, for a tip width greater than hundred nanometers. In contrast, in the absence of layer 503, layer 501 would have to be tapered such that its mode may directly couple into layer 502, the dimensions of taper tip of layer 501 (not shown) would have to be much less than one hundred nanometers for a similar coupling efficiency. In some embodiments (not shown), the taper tip can physically touch layer 506 or, if layer 506 is not present, layer 501. In yet another embodiment (not shown), there is no abrupt termination of layer 502 in a taper tip, but the width variation continues to facilitate more efficient coupling.

One or more lithography alignment marks 520 (only one is shown for simplicity) are used for precise alignment between various processing steps.

In the embodiment shown in FIG. 5, layer 503 is not removed from the top of layer 502 once the optical mode transitions to the one dominantly residing in the waveguide for which layer 502 provides the core, contrasting with the situation for layers 103 and 102 in the embodiments of FIG. 1 (or correspondingly for layers 303 and 302, or 403 and 402 in FIGS. 3 and 4 respectively). The difference may be easily seen with the help of end-on-views 600A, 600B and 600C in FIG. 6. This change is enabled in this embodiment because the materials are selected such that the refractive index of layer 503 is lower than the refractive index of layer 502, so layer 503 can serve as cladding for layer 502. This embodiment simplifies the fabrication of the integrated photonic device, as it relaxes the requirements on the etch control required in cases where the intermediate layer has to be removed from an area above the passive layer, as in the case of layers 103 over 102 in FIG. 1 (or of layers 303 and 403 over 302 and 402 respectively in FIGS. 3 and 4).

Functional layers 501, 502, 503, 506 and 509 (unless explicitly defined differently) correspond to functional layers 301, 301, 303, 306 and 309 as described in relation to FIG. 3, and layers 601, 602, 603, 606 and 609 in FIGS. 6a and 6b to be described below.

Figure 6A:
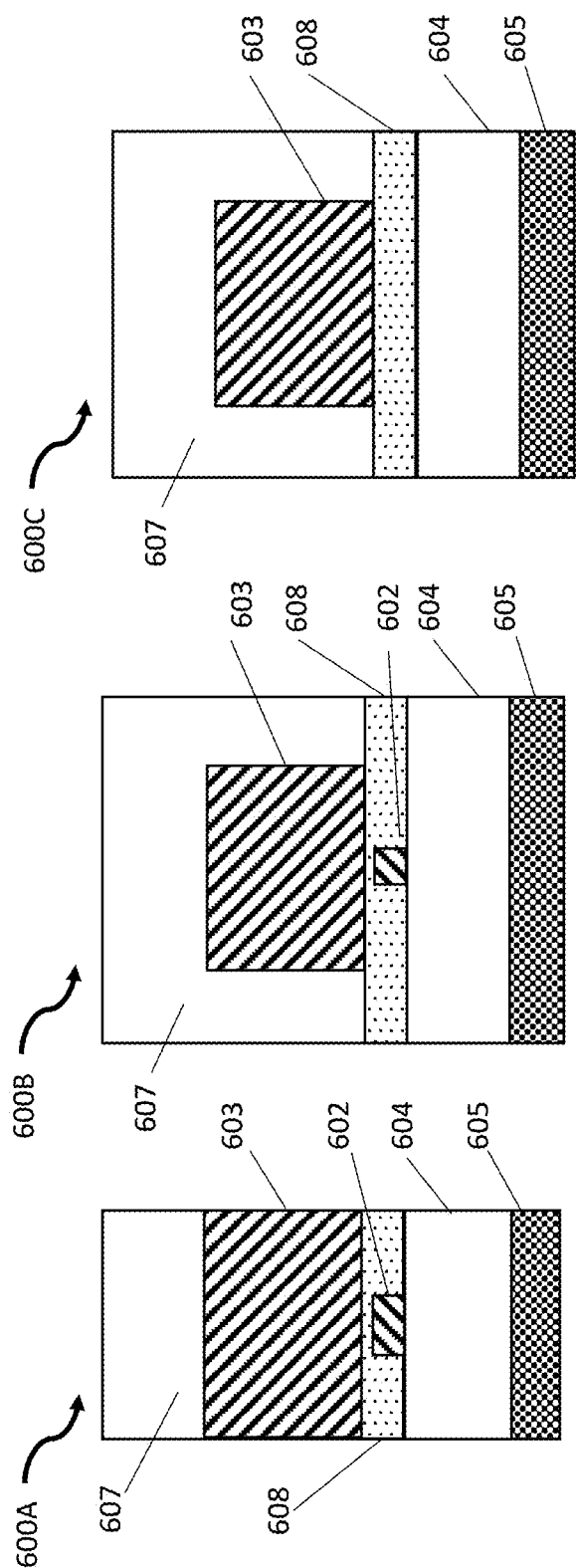
FIG. 6a shows cross-sectional end-on views at three different axial positions of a device corresponding to an embodiment of FIG. 5.
Figure 6B:
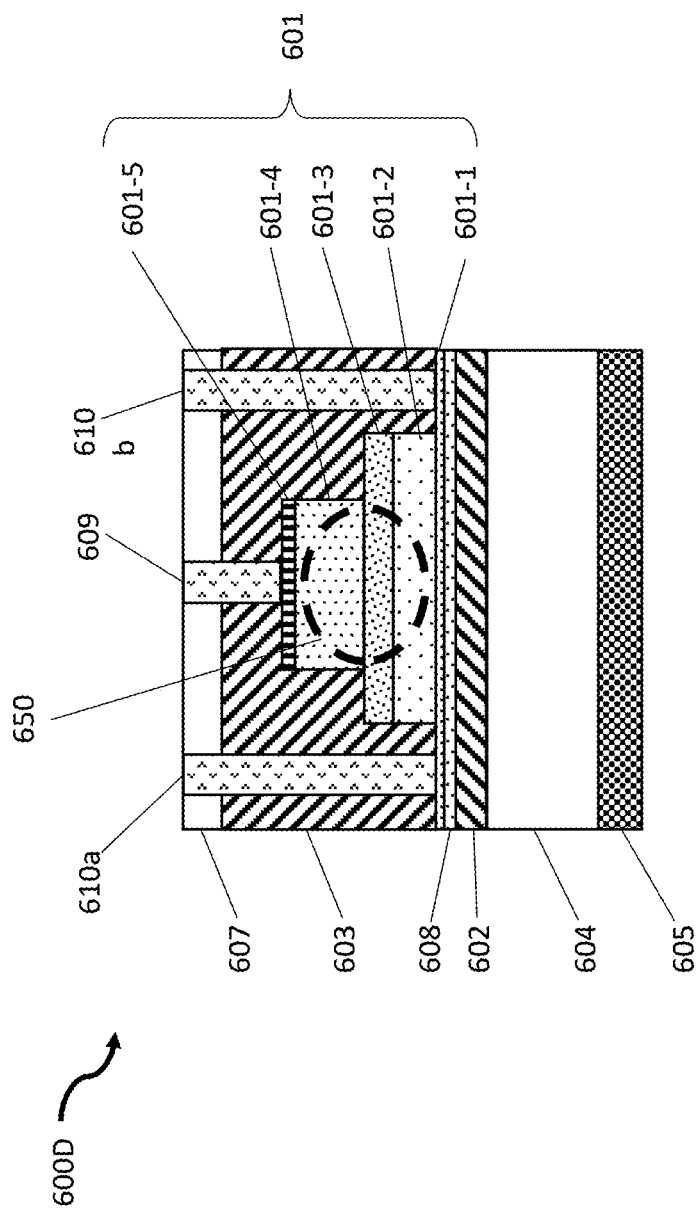
FIG. 6b shows a cross-sectional end-on view at a fourth axial position of a device corresponding to an embodiment of FIG. 5.

FIG. 6a shows three cross-sectional views 600A, 600B, and 600C corresponding to three characteristic locations marked A, B, and C, in FIG. 5) with FIG. 6b showing a cross-sectional view 600D corresponding to a characteristic location marked D in FIG. 5. Functional layers 601 to 609 (unless explicitly defined differently) correspond to functional layers 101 to 109 as described in relation to FIG. 1, and to functional layers 301 to 309 as described in relation to FIG. 3 and functional layers 401 to 409 as described in relation to FIG. 4.

In FIG. 6a, cross-section 600A shows a cross-sectional view through a plane cut through the far left of the device shown in view 500 of FIG. 5, after optical coupling to layer 602 (assuming optical signal flow occurs from right to left in view 500 of FIG. 5) is complete. Layer 602 provides the core of the waveguide, while layers 603, 604 and 608 serve as cladding. Cross-section 600B shows one embodiment in which transition of mode from one dominantly residing in layer 603 to one dominantly residing in layer 602 is facilitated. This transition is facilitated by tapers realized in layer 602. Cross-section 600C shows one embodiment in which mode dominantly resides in layer 603 after it was butt-coupled from the structure providing guiding in active region as described in relation to FIGS. 1, 3, and 4.

In FIG. 6b, cross-section 600D shown an exemplary cut through a region that comprises active layer 601 (corresponding to 201 in FIG. 2a). Functional layers 601 to 610b (unless explicitly defined differently) correspond to functional layers 201 to 210b as described in relation to FIG. 2a with a key difference that layer 603 serves as primary cladding, in contrast to FIG. 2a in which layer 207 serves as primary cladding. Note that although layer 607 is present in some parts of the device, it does not serve as the cladding for layer 602 at or near the taper region. In some embodiments, there is an additional thin layer (not shown) between layer 603 and 601 to provide surface passivation. Mode shape 650, generally, is slightly different from the mode shape 250, as the index contrast at the boundary between 601 and the cladding is different in those two cases.

Embodiments of the present invention offer many benefits. The integration platform enables scalable manufacturing of PICs made from multiple materials and capable handling high optical power compared to typical Si waveguide-based or InP waveguide-based PICs.

Previous approaches have generally used taper structures to transfer an optical mode from an active device to a passive device, where a width of compound semiconductor region is adiabatically tapered down to sub-micron size. However, a required width of the taper tip decreases rapidly to tens of nanometer sizes as the difference in refractive indices increases. The present invention deploys a butt coupling scheme to relax the requirements on taper size in any of the waveguides being coupled, which eases fabrication of such structures.

Other approaches have relied on die attachment of pre-fabricated optical active devices to passive waveguides. This requires very stringent alignment accuracy which is typically beyond what a typical die-bonder can provide. This aspect limits the throughput of this process as well as the performance of optical coupling.

This present invention utilizes a process flow consisting of typically wafer-bonding of a blanket piece of compound semiconductor material on a carrier wafer with dielectric waveguides and subsequent semiconductor fabrication processes as is known in the art. It enables an accurate definition of optical alignment between active and passive waveguides via typically photo lithography step, removing the need for precise physical alignment. Said photo lithography-based alignment allows for scalable manufacturing using wafer scale techniques.

Efficient optical transfer between dissimilar materials is facilitated by using a butt-coupling approach in combination with a mode-converter (the intermediate waveguide) that removes the need for narrow taper tips that are challenging to resolve and fabricate with current state-of-the-art tools.

It is to be understood that optical coupling between modes in active and passive layers is reciprocal, so that, taking FIG. 1 as exemplary, the structure can be configured to facilitate light transmission from region 101 to region 102, but also to facilitate transmission in the reverse direction, from region 102 to region 101. In is to be understood that multiple such transitions with no limitation in their number or orientation can be realized on a suitably configured PIC.

In some embodiments the active region can utilize the substrate for more efficient thermal sinking, due to direct contact to the substrate with no dielectric in-between. In such embodiments, active region fully defines the optical waveguide in active region and transitions to passive region via the above-mentioned butt-coupling.

In some embodiments, the active region creates a hybrid waveguide structure with dielectric layers which can be used, for example, to create a wavelength selective component formed inside the laser cavity for e.g. distributed feedback (DFB) lasers or similar components.

Embodiments of the optical devices described herein may be incorporated into various other devices and systems including, but not limited to, various computing and/or consumer electronic devices/appliances, communication systems, sensors and sensing systems.

It is to be understood that the disclosure teaches just few examples of the illustrative embodiment and that many variations of the invention can easily be devised by those skilled in the art after reading this disclosure and that the scope of the present invention is to be determined by the following claims.

The invention claimed is:

1. A device comprising:
   first, second and third elements fabricated on a common substrate;
   wherein the first element comprises an active waveguide structure comprising at least three sub-layers supporting a first optical mode, the second element comprises a passive waveguide structure supporting a second optical mode, and the third element, at least partly butt-coupled to the first element, comprises an intermediate waveguide structure supporting two or more intermediate optical modes;
   wherein a first sub-layer in the active waveguide structure comprises an n-contact layer, a second sub-layer in the active waveguide structure comprises a p-contact layer, and a third sub-layer in the active waveguide structure comprises an active region;
   wherein, a tapered waveguide structure in at least one of the second and third elements facilitates efficient adiabatic transformation between the second optical mode and one of the intermediate optical modes;
   wherein no adiabatic transformation occurs between any of the intermediate optical modes and the first optical mode; and
   wherein mutual alignments of the first, second and third elements are defined using lithographic alignment marks that facilitate precise alignment between layers formed during processing steps of fabricating the first, second and third elements.

2. The device of claim 1,
   wherein the second element comprises a planar top surface underlying and in direct contact with a lower surface of the third element.

3. The device of claim 1,
   wherein an interface between the first and third elements is angled at an angle optimized to minimize reflections between the first and third elements.

4. The device of claim 1,
   wherein the n-contact layer and the p-contact layer comprise highly-doped GaAs layers.

5. The device of claim 1,
   wherein the active region comprises quantum wells.

6. The device of claim 1,
   wherein the active region comprises quantum dots.

7. The device of claim 1,
   wherein the active region comprises a pin-junction.

8. The device of claim 1,
   wherein the second element has a refractive index between 1.8 and 2.5, and a thickness between 20 nm and 2000 nm.

9. The device of claim 1,
   wherein the third element has a refractive index between 1.55 and 2.2, and
   wherein the refractive index of the third element is lower than the refractive index of the second element.

10. The device of claim 1,
    wherein the active waveguide structure in the first element comprises at least five sub-layers supporting a first optical mode; and
    wherein a fourth sub-layer in the active waveguide structure comprises an n-cladding layer, and a fifth sub-layer in the active waveguide structure comprises a p-cladding layer.

11. The device of claim 10,
    wherein the n-cladding layer and the p-cladding layer comprise AlGaAs layers, with an Al concentration between 5% and 60%.

12. The device of claim 10,
    wherein a sixth sub-layer in the active waveguide structure comprises an etch stop layer.

13. The device of claim 10,
    wherein the first element is defined using at least one etch to provide optical mode confinement and to open an n-contact region for metal deposition.

14. A device comprising:
    first, second and third elements fabricated on a common substrate;
    wherein the first element comprises an active waveguide structure supporting a first optical mode, the second element comprises a passive waveguide structure supporting a second optical mode, and the third element, at least partly butt-coupled to the first element, comprises an intermediate waveguide structure supporting two or more intermediate optical modes;
    wherein the third element provides cladding for the second element;
    wherein a tapered waveguide structure in second element facilitates efficient adiabatic transformation between the second optical mode and one of the intermediate optical modes;
    wherein no adiabatic transformation occurs between any of the intermediate optical modes and the first optical mode; and
    wherein mutual alignments of the first, second and third elements are defined using lithographic alignment marks that facilitate precise alignment between layers formed during processing steps of fabricating the first, second and third elements.

15. The device of claim 14,
    wherein the second element comprises a planar top surface underlying and in direct contact with a lower surface of the third element.

16. The device of claim 14,
    wherein an interface between the first and third elements is angled at an angle optimized to minimize reflections between the first and third elements.

17. The device of claim 16, further comprising:
    an anti-reflective coating layer deposited on the angled interface.

* * * * *